United States Patent Office 3,074,899
Patented Jan. 22, 1963

---

3,074,899
PROCESS FOR PRODUCTION OF POLYCHLOROPRENE LATICES USING A PARAFFIN SULFONATE EMULSIFIER
Dietrich Rosahl and Heinz Esser, Koln-Stammheim, Germany, assignors to Farbenfabriken Bayer Aktiengesellschaft, Leverkusen, Germany, a corporation of Germany
No Drawing. Filed Dec. 19, 1958, Ser. No. 781,479
Claims priority, application Germany Jan. 4, 1958
3 Claims. (Cl. 260—29.7)

The present invention relates to a process of producing polychloroprene latices by polymerizing chloroprene in aqueous emulsions in the presence of specific emulsifying agents and modifiers.

Polychloroprene latices are used on a large scale for the production of dipped articles, and also for coating textiles, leather and paper. By comparison with natural rubber or other synthetic latices, they show the advantage of having good resistance to oil, ozone and ageing. In the vulcanized condition, the films have a high strength value and excellent flame resistance, even in mixtures not containing fillers.

It is known that polychloroprene latices have a strong natural tackiness and for this reason are difficult to release from molds, such as those used inter alia in the manufacture of dipped articles. In such cases, use is made of special complicated procedures which involve considerable expenditure of time, such for example as stripping the dipped film from the mold while still moist and prior to vulcanization and thereafter carrying out the vulcanization, which in this case takes a much longer time than usual. It is also possible so to proceed that the dipped films are vulcanized after drying on the mold and the vulcanizates are placed for some time in water for the purpose of better release from the mold.

When coating textile, paper or leather foils, the disadvantage of the strong latex tackiness becomes apparent in that the coated materials stick firmly to one another when stored under pressure and thus become unserviceable.

An additional disadvantage of the hitherto known polychloroprene latices relates to the fact that the dipped elements or the coated foils acquire an undesirable yellowish to brownish colouring on vulcanization.

It has now been found possible to produce polychloroprene latices not showing the said disadvantages if water-soluble surface-active paraffin sulphonates, which can be obtained by way of sulphochlorination of aliphatic hydrocarbons having a carbon chain of about 10 to 20 carbon atoms according to German patent specifications Nos. 715,747 and 859,452, are introduced as emulsifiers into the polymerization mixture and the polymerization is carried out in the presence of small quantities of long-chain primary, secondary or tertiary alkyl mercaptanes having a carbon chain of about 8 to 20 carbon atoms, as regulators, at temperatures of from 10° to 60° C. The said emulsifiers are introduced in quantities of from 1 to 10 percent by weight and the regulators in quantities of from 0.001 to 0.1 percent by weight, based on the quantity of chlorobutadiene. The polychloroprene produced by this process has a Defo value not lower than 2000, and preferably of from 2000 to 10,000. The pH value of the polymerization medium is preferably kept at 3 to 11. To obtain pure white polymer films, it is advisable to dispense with the conventional addition of colouring anti-oxidizing agents and stabilizers such for example as phenothiazine and p-tert-butylpyrocatechol. To remove the last traces of stabilizer, it is advisable that the chloroprene, before being introduced, should be passed over an acid-activated bleaching earth as an absorption filter. A highly active bleaching earth is put on the market, for instance, under the trade name "Tonsil." "Tonsil" is an acid-activated bleaching earth prepared by the steps of slurrying clay with water, then screening it, leaching with hydrochloric acid at elevated temperatures, filtering, drying, and then grinding to a suitable size. This process is described in the publication identified as P.B. 25658 "The German Activated Bleaching Earth Industry, With Some Observations On German Bentonite and Newburg Chalk," pages 1-5, reported by Danckwerts and Wilson, BIOS Trip No. 1680, December 1, 1945. As agents for halting the polymerization, it is advisable to use light-fast age-resistors of the general formula:

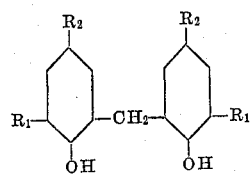

wherein $R_1$ stands for an alkyl or cycloalkyl group, such as —$C(CH_3)_3$ or cyclohexyl and $R_2$ stands for an alkyl group having 1 to 12 carbon atoms, perferably methyl and ethyl.

Such compounds are disclosed in United States patent specification No. 2,538,355; British patent specification No. 719,241 and German patent specification No. 912,862. They are preferably applied in amounts of 0.01-5 percent as calculated on the weight of monomer.

The present process is not only suitable for the production of homopolymers of chloroprene, but may also be applied for the production of copolymers of chloroprene with other ethylenically unsaturated monomers which are copolymerizable with chloroprene, such as dichlorobutadiene, butadiene, styrene, vinylidenechloride. These further monomers are preferably applied in quantities of 1-20 percent as calculated on the weight of the total monomers.

After being degasified, the latex is brought to a solid content of about 40 to 60 percent, according to its proposed use, this being effected by one of the conventional concentration methods (creaming, centrifuging or evaporation).

The films or coated foils produced from these latices have a low natural tackiness at room temperatures, but can satisfactorily be welded to one another at relatively high temperatures, this being desirable for many purposes. Even when vulcanized, the films can easily be removed from the molds without additional measures being taken.

The low tackiness permits the use of such latices for special purposes, for example as binders for the manufacture of fibre fleeces which in their turn are employed for the manufacture of impression rollers having a surface with a low degree of tackiness.

In addition, the films produced from the latices of this invention are characterized by being pure white in color, in having a certain degree of transparency and in showing no tendency to become yellow or brown on vulcanization. Finally, as an advantage by comparison with films from commercially available latices, they show a higher resistance to ketones, and more especially to acetone. The tensile strength of the vulcanizates is in some cases considerably higher than the corresponding values of vulcanizates obtained from the hitherto known polychlorobutadiene latices.

In the following examples, the parts indicated are parts by weight.

*Example 1*

100 parts of water, 3 to 5 parts of the sodium or potassium salt of a paraffin sulphonic acid having 12 to 18 carbon atoms (emulsifier) and 0.5 part of sodium pyrophosphate are stirred in a pressure-tight vessel with 100 parts of monomeric 2-chlorobuta-1,3-diene which has been freed from stabilizer, for example, phenothiazine, by passing it over a column of acid-activated bleaching earth, and 0.05 part of n-dodecylmercaptane, and the mixture heated to a temperature of 35° C. Polymerization starts after adding 0.0005 part of potassium persulphate.

On reaching a conversion of 80 percent, the reaction is stopped by adding 1 to 2 parts of bis-(2-hydroxy-3-cyclohexyl-5-methyl-phenyl)-methane, which is dissolved in 1 to 2 parts of chloroprene and is emulsified with 2 to 4 parts of a 2 percent aqueous solution of this aforementioned emulsifier.

The latex is degasified by means of a baffle plate column and is concentrated to a solid content of 50 percent by creaming, after adding 8 parts of a 2 percent sodium alginate solution per 100 parts of latex.

*Example 2*

The latex polymerized and degasified according to Example 1 is concentrated to a solid content of 50 to 60 percent by evaporation in vacuo at 50° C.

The latices produced according to Examples 1 and 2 were mixed with vulcanizing agents in the following proportions:

100.0 parts of rubber (dry substance),
5.0 parts of zinc oxide,
1.0 part of colloidal sulphur,
1.5 parts of zinc diethyl dithiocarbamate,
10.0 parts of kaolin,
1.0 part of dispersing agent, and
19.0 parts of water.

The physical properties were then tested as follows: The DIN-standard rod 1 (German industrial standard 53504) served in all cases as the test element. Thickness of the test element: 1.5 to 1.6 mm. The test elements were obtained by pouring the latex mixture onto flat porous clay plates, which were provided with fittings so that the mixture was prevented from flowing off, and a film with a uniform and definite wall thickness could be produced.

| Time of vulcanization at 100° C. in minutes | Tensile strength, kg./cm.² | Breaking elongation |
|---|---|---|
| 0 | | |
| 20 | 112 | 770 |
| 35 | 148 | 985 |
| 40 | 171 | 1,020 |
| 45 | 175 | 995 |
| 50 | 176 | 950 |
| 55 | 216 | 940 |
| 60 | 230 | 930 |
| 80 | 230 | 890 |
| 120 | 245 | 870 |
|  | 202 | 865 |

Defo value: 6050/47.

*Example 3*

Vulcanizates with a lower tendency to crystallization are obtained by polymerizing the mixture indicated in Example 1 at a temperature of 55° C. The necessary quantity of potassium persulphate is lowered in this case to 0.00025 part. The procedure in other respects is as in Examples 1 and 2.

As catalysts for carrying out the aforementioned polymerization process there come into question the well known free radical-forming catalysts, preferably oxygen liberating percompounds, furthermore, the well known redox systems such as combination of oxygen or of oxygen with reducing agents.

What we claim is:

1. A process for the production of a polychloroprene latex suited for the preparation of films having high lightfastness properties and a low degree of tackiness which comprises first freeing the chloroprene monomer of polymerization inhibitor by treating it with an acid-activated bleaching earth, and then polymerizing the purified chloroprene at temperatures between 10° and 60° C. in an aqueous emulsion containing 0.001–0.1% by weight of an alkyl mercaptan regulator of 8–20 carbon atoms, 1–10% by weight of a surface-active paraffin sulfonate emulsifier having 10–20 carbon atoms, said percentages being based on the weight of chloroprene, and a free radical polymerization catalyst.

2. The process of claim 1 wherein the polymerization is halted by adding to the polymerization system a compound of the formula:

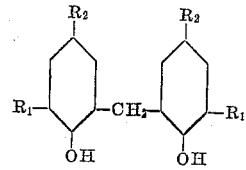

wherein $R_1$ is a member selected from the group consisting of an alkyl and a cycloalkyl group, and $R_2$ is an alkyl group of 1–12 carbon atoms.

3. The process of claim 1 wherein the chloroprene monomer is copolymerized with 1–20% by weight of a monomer selected from the group consisting of dichlorobutadiene, butadiene, styrene, and vinylidene chloride.

References Cited in the file of this patent

UNITED STATES PATENTS

| 2,462,390 | Harmon | Feb. 22, 1949 |
| 2,538,355 | Davis et al. | Jan. 16, 1951 |
| 2,763,635 | Tucker et al. | Sept. 18, 1956 |
| 2,800,503 | Crosby et al. | July 23, 1957 |

FOREIGN PATENTS

| 450,033 | Canada | July 20, 1948 |

OTHER REFERENCES

Whitby: "Synthetic Rubber," John Wiley and Sons, New York (1954), pages 695 and 770.

Schildknecht: "Vinyl and Related Polymers," John Wiley and Sons (1952), pages 8 and 9.